Feb. 28, 1933.  J. R. NOSS  1,899,879
SAFETY WRIST PIN
Filed Feb. 15, 1932
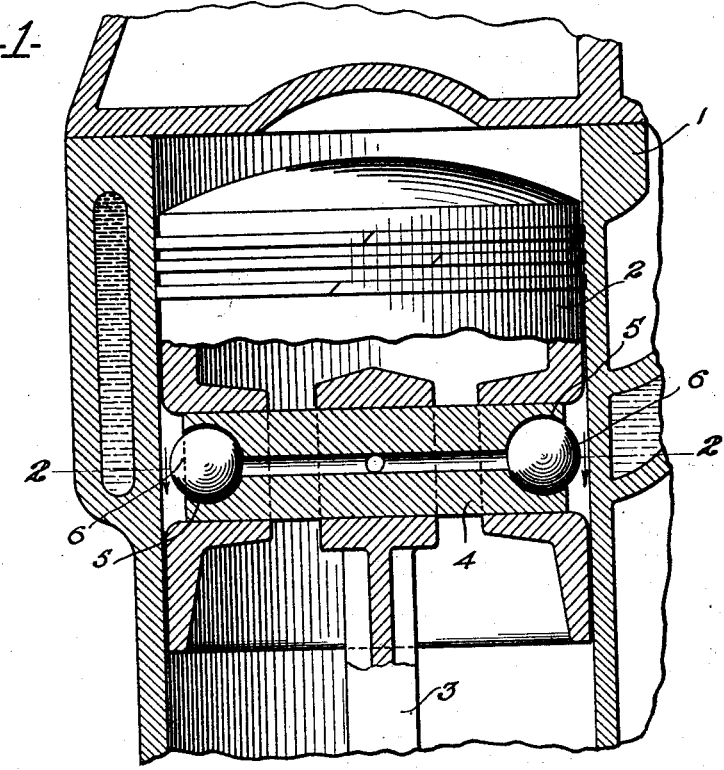
Fig-1-
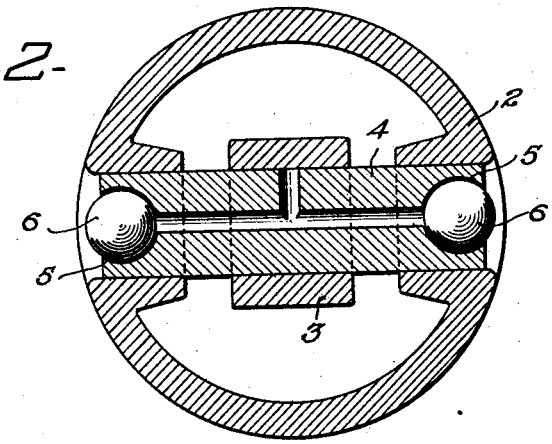
Fig-2-
James R. Noss
INVENTOR
BY *Victor J. Evans & Co.*
ATTORNEY
WITNESS:

Patented Feb. 28, 1933

1,899,879

UNITED STATES PATENT OFFICE

JAMES R. NOSS, OF ALIQUIPPA, PENNSYLVANIA

SAFETY WRIST PIN

Application filed February 15, 1932. Serial No. 593,139.

This invention relates to safety wrist pins and has for the primary object, the provision of a device of the above stated character which is so constructed that should the wrist pin become free to engage the walls of a cylinder it will be prevented from scoring or injuring the latter.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating a cylinder and piston therein providing a wrist pin constructed in accordance with my invention.

Figure 2 is a sectional view taken on the line 2—2 of Figure 1.

Referring in detail to the drawing, the numeral 1 indicates a cylinder in which is reciprocally mounted a piston 2 attached to a connecting rod 3 by a wrist pin 4, the latter forming the subject-matter of the present invention.

In constructions of this kind the wrist pin is either anchored to the connecting rod 3 or to the piston for the purpose of preventing the wrist pin from having endwise movement, however, during use the wrist pin sometimes becomes free shifting its position so that one end will drag or rub against the wall of the cylinder injuring or scoring the latter, and to overcome this disadvantage, the wrist pin 4 has formed in its ends semi-circular seats 5 in which are rotatably supported balls or anti-friction elements 6 normally spaced from the walls of the cylinder. Should the wrist pin 4 become free during the reciprocation of the piston and shift endwise, the anti-friction medium 6 carried by the end of the wrist pin coming in close proximity to the wall of the cylinder will be limited in the stated endwise movement by the anti-friction medium engaging and rolling over the wall of the cylinder, thereby preventing the end of the wrist pin from scoring or injuring the cylinder.

The wrist pin is provided with a lubricating passage communicating with the seats so that the anti-friction mediums will be furnished with lubricant.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A safety wrist pin comprising a wrist pin body having formed in the ends thereof seats, anti-friction balls journalled in said seats and adapted to prevent the ends of the wrist pin body from engaging with the walls of a cylinder.

2. In combination with a cylinder having a piston reciprocally mounted therein and secured to a connecting rod by a wrist pin, and anti-friction balls journalled in the ends of the wrist pin and normally positioned in spaced relation to the walls of the cylinder and adapted during an endwise movement of the wrist pin relative to the piston to contact with the walls of the cylinder to prevent scoring of the latter.

In testimony whereof I affix my signature.

JAMES R. NOSS.